(12) United States Patent
Comeaux

(10) Patent No.: US 10,611,200 B2
(45) Date of Patent: Apr. 7, 2020

(54) TRAILER CART

(71) Applicant: Ray Comeaux, Mountain City, TN (US)

(72) Inventor: Ray Comeaux, Mountain City, TN (US)

(73) Assignee: COMEAUX TECHNOLOGIES, INC., Mountain City, TN (US)

( * ) Notice: Subject to any disclaimer, the term of this patent is extended or adjusted under 35 U.S.C. 154(b) by 132 days.

(21) Appl. No.: 15/806,493

(22) Filed: Nov. 8, 2017

(65) Prior Publication Data

US 2018/0178605 A1   Jun. 28, 2018

Related U.S. Application Data

(60) Provisional application No. 62/498,461, filed on Dec. 27, 2016.

(51) Int. Cl.
| | |
|---|---|
| B60D 1/54 | (2006.01) |
| B62D 63/06 | (2006.01) |
| B62D 21/20 | (2006.01) |
| B62D 25/16 | (2006.01) |
| B62D 63/08 | (2006.01) |
| B60D 1/155 | (2006.01) |
| B60D 1/06 | (2006.01) |
| B60P 3/04 | (2006.01) |

(52) U.S. Cl.
CPC ............ B60D 1/54 (2013.01); B60D 1/06 (2013.01); B60D 1/155 (2013.01); B62D 21/20 (2013.01); B62D 25/16 (2013.01); B62D 63/061 (2013.01); B62D 63/068 (2013.01); B62D 63/08 (2013.01); B60P 3/04 (2013.01)

(58) Field of Classification Search
CPC .......... B62D 1/54; B62D 21/20; B62D 25/16; B62D 63/061; B62D 63/068; B62D 63/08; B60D 1/06; B60D 1/155; B60P 3/04

See application file for complete search history.

(56) References Cited

U.S. PATENT DOCUMENTS

| | | | | |
|---|---|---|---|---|
| 3,977,691 | A * | 8/1976 | Robertson | B60P 3/40 280/81.1 |
| 3,979,133 | A * | 9/1976 | Morris | B62D 21/14 280/42 |
| 4,519,738 | A * | 5/1985 | Wood | B60P 3/1033 280/414.1 |
| 5,362,195 | A * | 11/1994 | Wagner | B60P 3/07 280/789 |
| 7,455,312 | B2 * | 11/2008 | Senatore | B60D 1/54 280/475 |

(Continued)

Primary Examiner — Joseph M Rocca
Assistant Examiner — Marlon A Arce
(74) Attorney, Agent, or Firm — Dunlap Bennett & Ludwig PLLC

(57) ABSTRACT

A trailer cart. The trailer cart includes a frame having a front end, a rear end and sides. A wheel assembly is attached to the frame. The wheel assembly includes an axle and a pair of wheels. A tongue is attached to and extends from the front end of the frame. The tongue includes a trailer coupler configured to secure to a trailer ball. A winch assembly is attached to the trailer. The winch assembly includes an upright post and a winch attached to the upright post. The winch assembly is attached to at least one of the tongue and the frame and is disposed near the front end of the frame.

11 Claims, 5 Drawing Sheets

(56) References Cited

U.S. PATENT DOCUMENTS

| | | | | |
|---|---|---|---|---|
| 7,857,331 | B2* | 12/2010 | Walters, Jr. | B62D 53/067 |
| | | | | 180/209 |
| 9,623,785 | B2* | 4/2017 | Hynd | B62D 63/061 |
| 9,987,964 | B1* | 6/2018 | Napier | B60P 3/1033 |
| 2001/0024026 | A1* | 9/2001 | Knutsson | B60P 3/1066 |
| | | | | 280/414.1 |
| 2004/0032114 | A1* | 2/2004 | Hagen | B62D 63/061 |
| | | | | 280/656 |
| 2006/0279071 | A1* | 12/2006 | Spainhower | B62D 63/061 |
| | | | | 280/656 |
| 2009/0220325 | A1* | 9/2009 | Berney | B60P 1/52 |
| | | | | 414/494 |
| 2010/0232148 | A1* | 9/2010 | Sharpley | B60P 3/18 |
| | | | | 362/183 |
| 2015/0028562 | A1* | 1/2015 | Hill | B62D 63/08 |
| | | | | 280/400 |
| 2015/0115652 | A1* | 4/2015 | Peng | B62D 25/168 |
| | | | | 296/180.4 |
| 2016/0001832 | A1* | 1/2016 | Beiler | B62D 59/04 |
| | | | | 414/550 |
| 2017/0036718 | A1* | 2/2017 | S Nchez Cabeza | |
| | | | | B62D 63/061 |
| 2017/0164600 | A1* | 6/2017 | Wilson | A01M 23/16 |
| 2017/0225599 | A1* | 8/2017 | Russo | B60P 1/283 |
| 2018/0257721 | A1* | 9/2018 | Johnson | B62D 63/061 |
| 2019/0111983 | A1* | 4/2019 | Nordstrom | B60D 1/54 |
| 2019/0135059 | A1* | 5/2019 | Niewiadomski | B60D 1/366 |

* cited by examiner

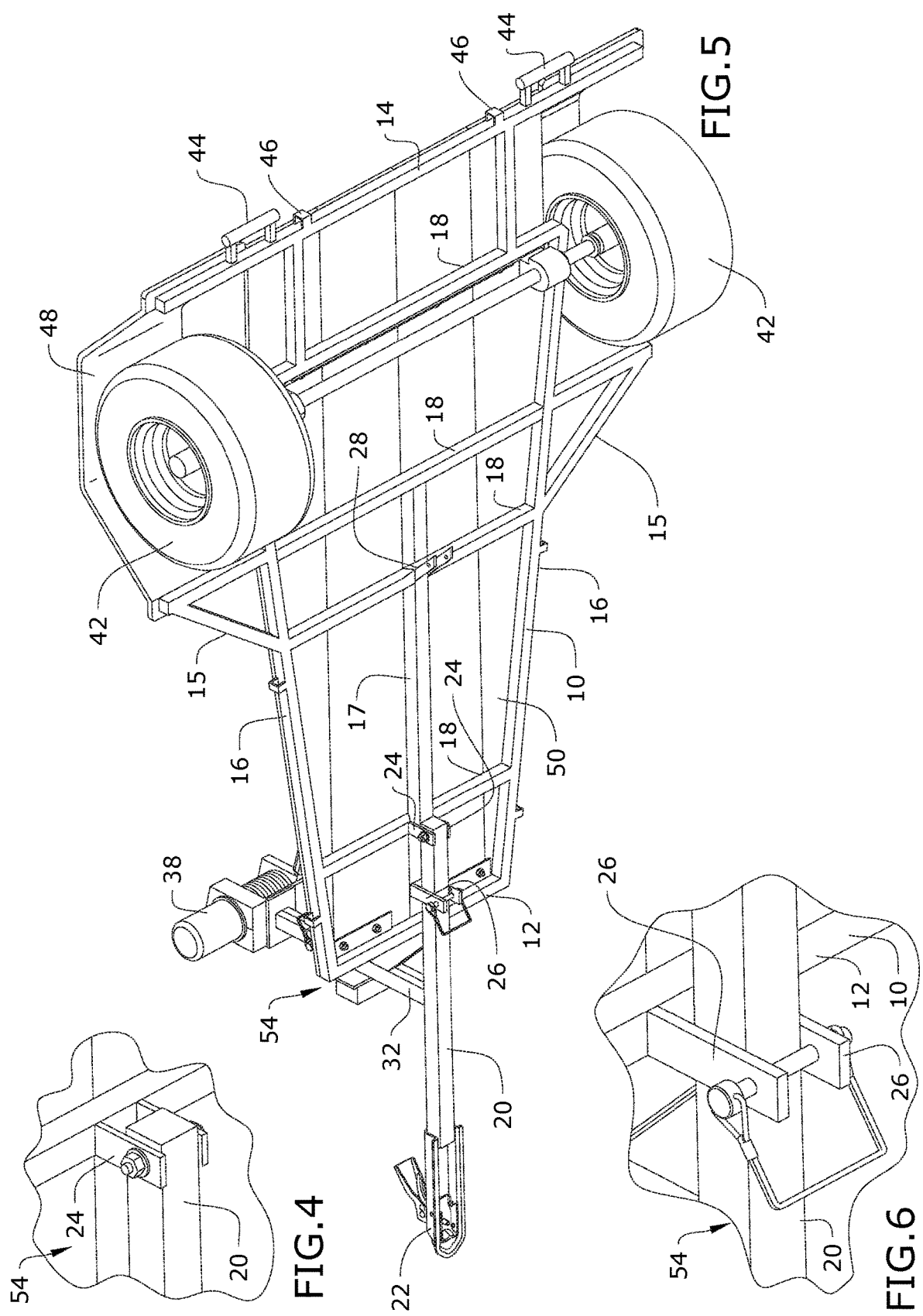

TRAILER CART

CROSS-REFERENCE TO RELATED APPLICATION

This application claims the benefit of priority of U.S. provisional application No. 62/498,461, filed Dec. 27, 2016, the contents of which are herein incorporated by reference.

BACKGROUND OF THE INVENTION

The present invention relates to a trailer cart and, more particularly, to a low profile trailer cart with an attached winch.

Hunters often travel to their hunting sites on all-terrain vehicles (ATVs, UTVs or the like) rather than in a larger vehicle, such as a truck or sport utility vehicle. Hunters often encounter situations where their bagged game and cargo are large and heavy. This typically result in loads and weight which present challenges to hunters, especially to those that have physical limitations.

As can be seen, there is a need for a low profile trailer cart with an attached winch.

SUMMARY OF THE INVENTION

In one aspect of the present invention, a trailer comprises: a frame comprising a front end, a rear end and sides; a wheel assembly attached to the frame, the wheel assembly comprising an axle and a pair of wheels; a tongue attached to and extending from the front end of the frame, the tongue comprising a trailer coupler; and a winch assembly comprising an upright post and a winch attached to the upright post, the winch assembly attached to at least one of the tongue and the frame and disposed near the front end of the frame.

These and other features, aspects and advantages of the present invention will become better understood with reference to the following drawings, description and claims.

BRIEF DESCRIPTION OF THE DRAWINGS

FIG. 4 is a section detail view of an embodiment of the present invention;

FIG. 5 is a bottom perspective view of an embodiment of the present invention in a deployed position;

FIG. 6 is a section detail view of an embodiment of the present invention;

DETAILED DESCRIPTION OF THE INVENTION

Figure 1:
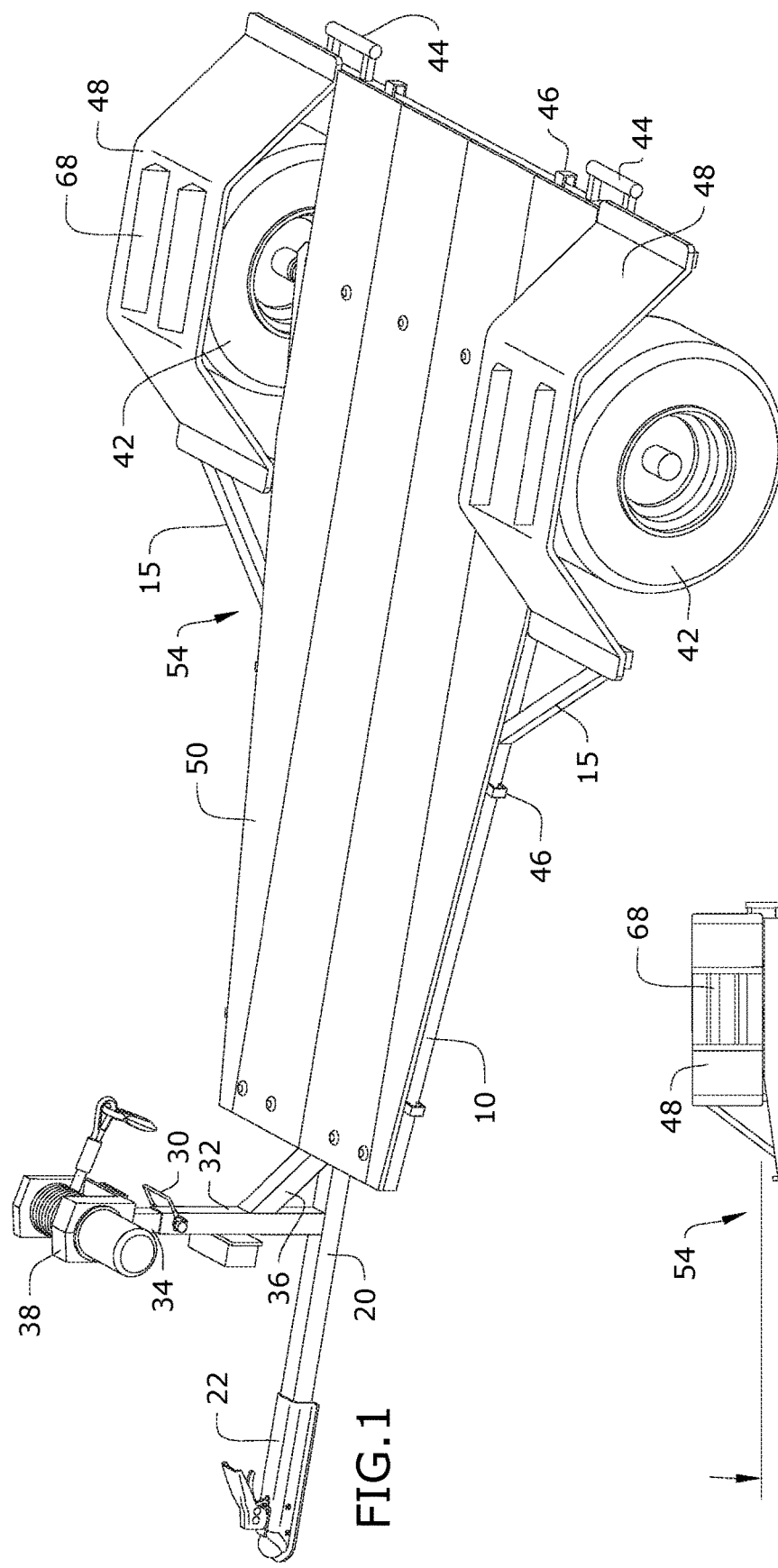
FIG. 1 is a perspective view of an embodiment of the present invention.
Figure 3:
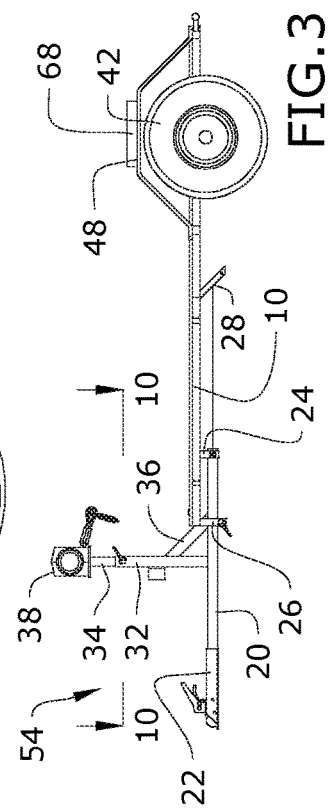
FIG. 3 is a side view of an embodiment of the present invention.
Figure 2:
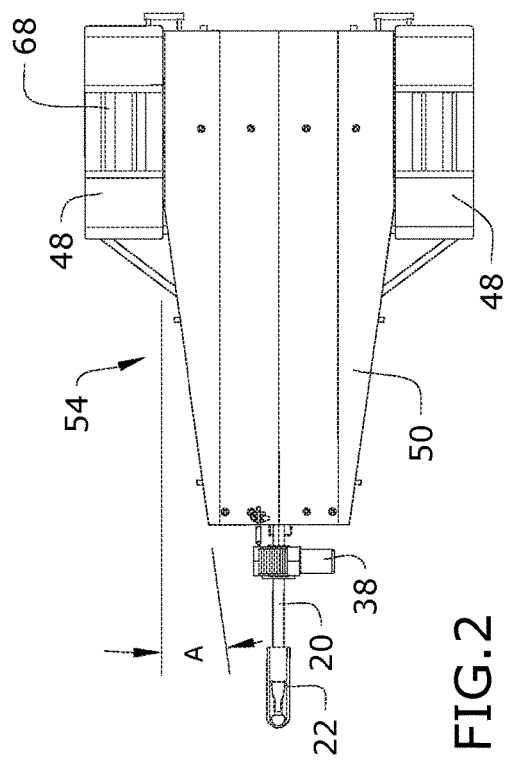
FIG. 2 is a top view of an embodiment of the present invention.
Figure 7:
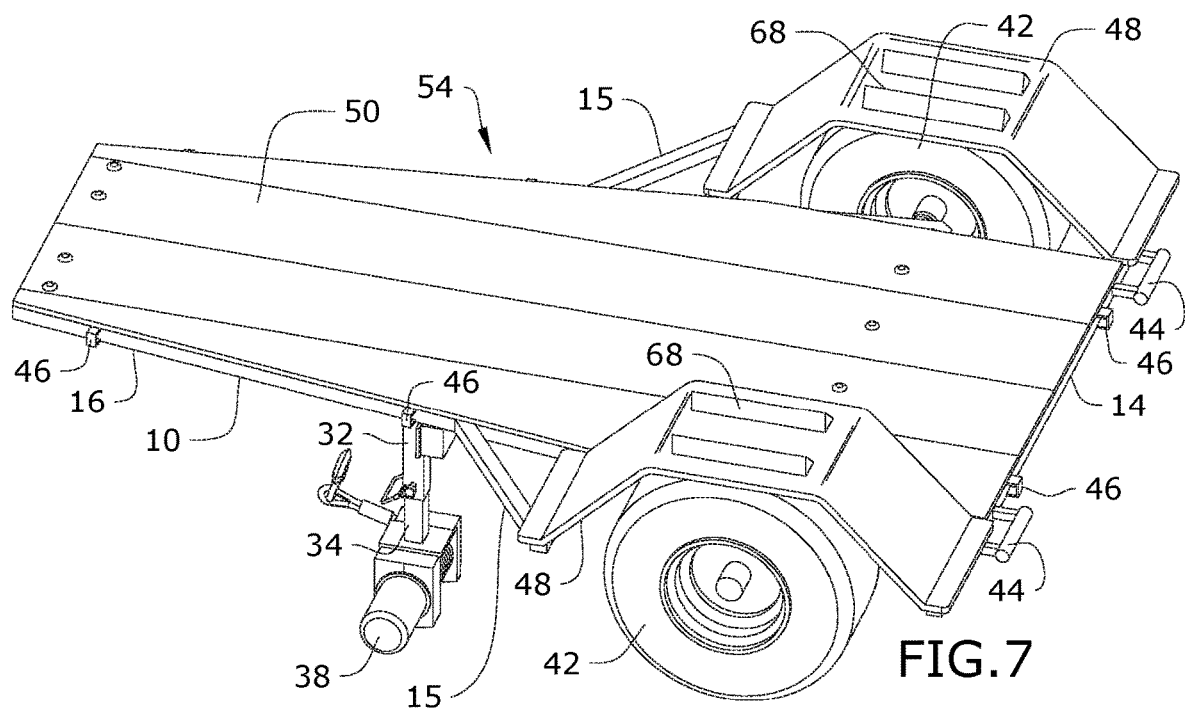
FIG. 7 is a top perspective view of an embodiment of the present invention in a stowed position.
Figure 8:
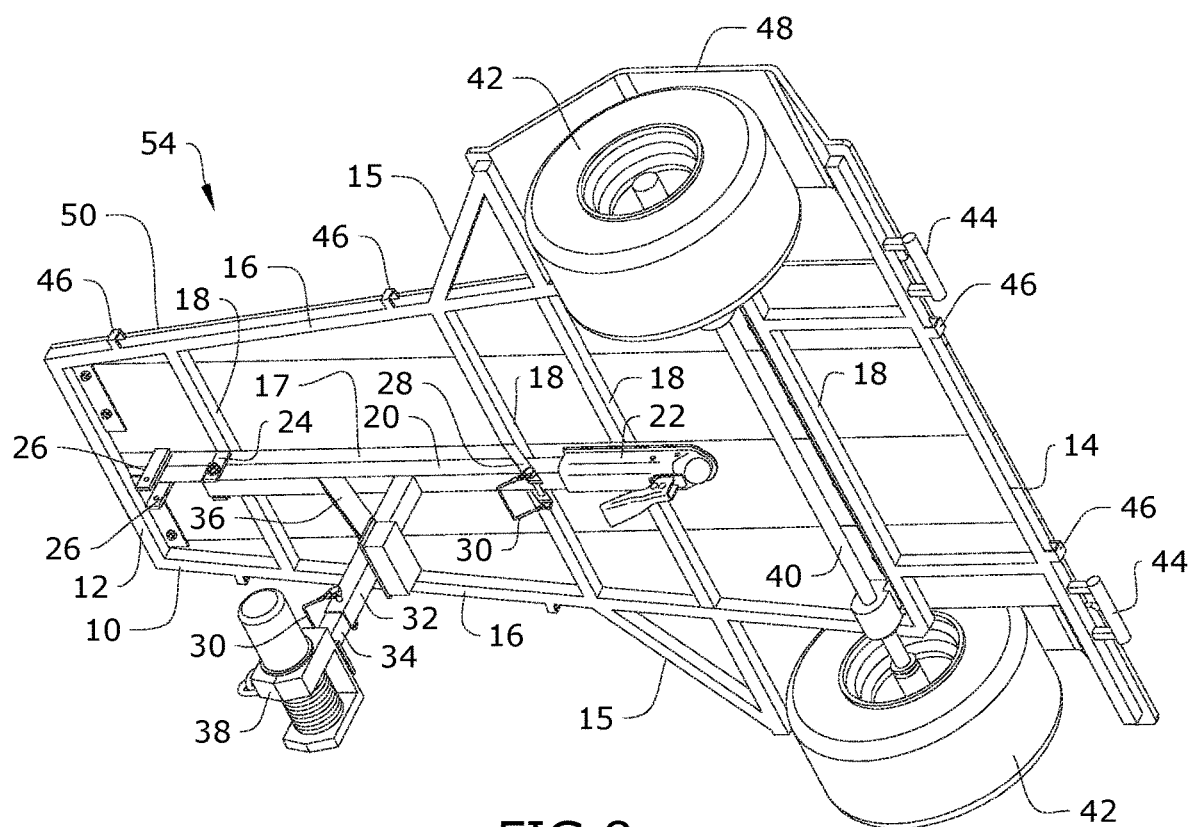
FIG. 8 is a bottom perspective view of an embodiment of the present invention in a stowed position.
Figure 9:
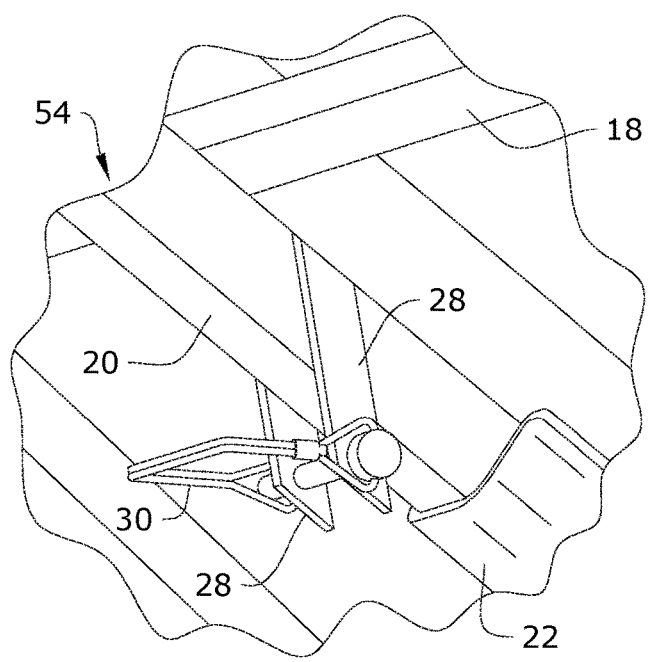
FIG. 9 is a section detail view of an embodiment of the present invention.
Figure 10:
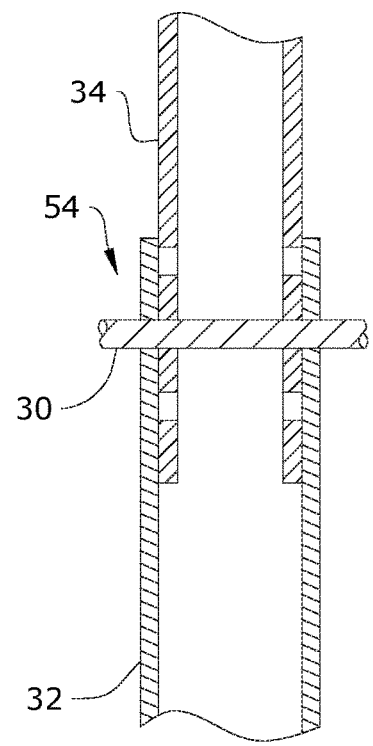
FIG. 10 is a detailed cross sectional view along line 10-10 of FIG. 3.
Figure 11:
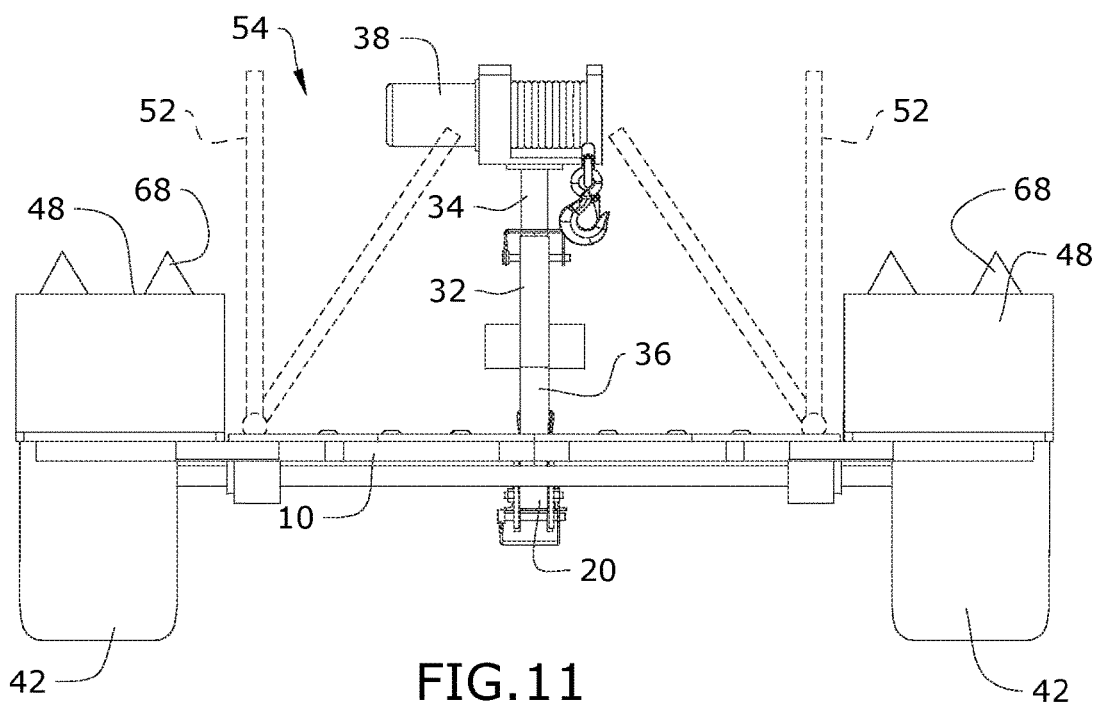
FIG. 11 is a rear view of an embodiment of the present invention.
Figure 12:
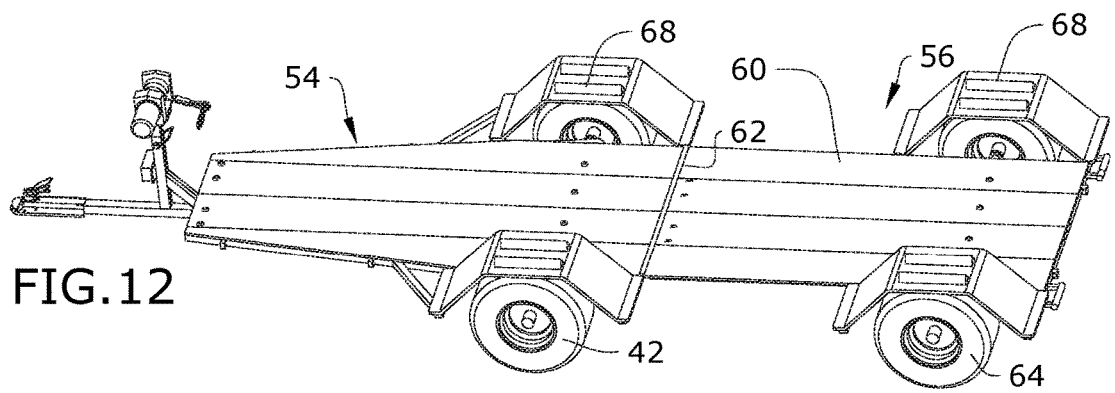
FIG. 12 is a top perspective view of an embodiment of the present invention in a deployed position.
Figure 13:
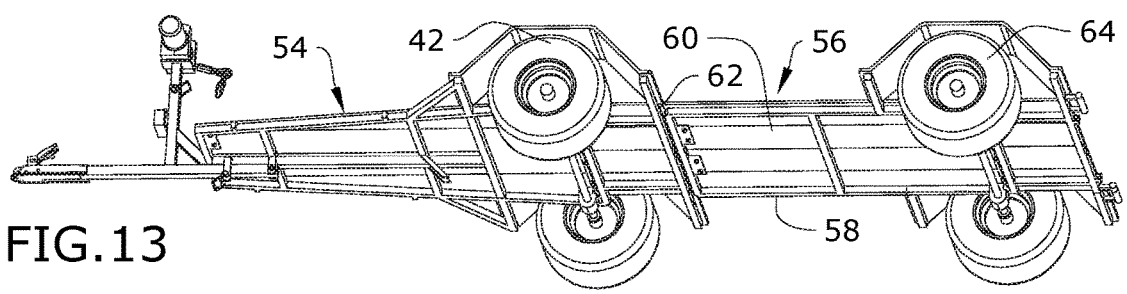
FIG. 13 is a bottom perspective view of an embodiment of the present invention in a deployed position.
Figures 14, 15:
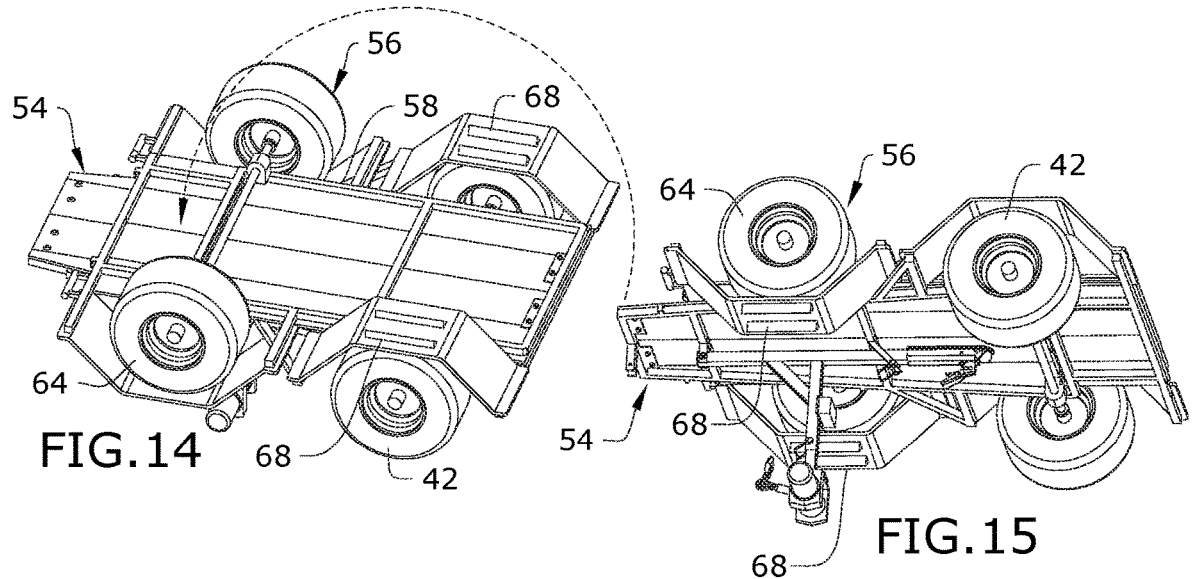
FIG. 14 is a top perspective view of an embodiment of the present invention in a stowed position.
FIG. 15 is a bottom perspective view of an embodiment of the present invention in a stowed position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present disclosure includes a low profile (low to the ground), tongue folding all-terrain transport trailer. The trailer may be used with ATVs, UTVs, golf carts and the like and may be used for off-road use. The present invention may utilize "no flat" tires on the trailer to eliminate the need for air compressors or manual air pumps that typically accompany problems with pneumatic tires. The foldable tongue allows for the trailer to be easily stored and minimizes the foot print that typically accompanies trailer storage. The low to the ground profile and manual or electric winch allows a hunter who is alone in the woods to easily load and secure onto the trailer large game, fish or cargo, for transport. The low to the ground trailer and winch may help those with physical limitations and may further alleviate injury due to lifting large and heavy loads onto a high off the ground ATV racks, other vehicles or trailers without a winch. Further, the present invention is light enough to handle when loading for transport on other trailers, to place in a truck bed or to place into storage.

Referring to FIGS. 1 through 16, the present invention includes a trailer. The trailer includes a frame 10 having a front end, a rear end and sides. The present invention further includes a wheel assembly attached to the frame 10. The wheel assembly includes an axle 40 and a pair of wheels 42. The trailer further includes a tongue 20 attached to and extending from the front end of the frame 10. The tongue 20 includes a trailer coupler 22 configured to secure to a trailer ball. A winch assembly is attached to the trailer. The winch assembly includes an upright post 32, 34 and a winch 38 attached to the upright post 32, 34. The winch assembly is attached to at least one of the tongue 20 and the frame 10 and is disposed near the front end of the frame 10.

The frame 10 of the present invention may be formed of plurality of members that are made of metal tubing, such as steel, aluminum and the like. A metal mesh may be attached to the rectangular tubing to add additional carrying capacity. The frame 10 of the present invention may include a front member 12 forming the front end, a rear member 14 forming the rear end and side members 16 forming the sides. The rear member 14 includes a greater length than the front member 12. In certain embodiments, the rear member 14 may range in length from about 24 inches up to about 60 inches and the front member 12 may range in length from about 12 inches to 40 inches. The front member 12 and the rear member 14 may be substantially parallel to one another. The side members 16 are disposed at an angle (A) relative to the front member 12 and the rear member 14 so that a distance between the side members 16 increases from the front member 12 to the rear member 14. The angle (A) may be from about 8 degrees up to below 90 degrees. The angled side members 16 deflect brush and trees when the trailer is rolling through the woods.

The frame further comprises transverse members 18 connecting the side members 16 together. The transverse members 18 may range from about 18 inches up to about 42 inches in length. In certain embodiments, the transverse members 18 may include an elongated transverse member 18. The wheel assembly is disposed in between the elongated transverse member 18 and the rear member 14. The elongated transverse member 18 may be substantially parallel with the rear member 14 and may include a length that is substantially the same as the rear member 14. The frame 10 may further include angle members 15 extending from the side members 16 to the elongated transverse member 18. The angle members 15 may include a greater angle relative to the front member 12 and rear member 14 than the side members 16. For example, the angle members 15 may range from about 45 degrees up to below a 90 degrees relative to the front member 12. The angle members 15 deflect bushes from getting into the axle 40 and wheels 42 and further deflect trees from damaging the wheel assemblies. In certain embodiments, the frame 10 may further include a central member 17 running from the front member 12 to the elongated transverse member 18, which is located directly in front of the axle. The central member 17 may be substantially perpendicular to the front member 12 and the rear member 14.

The present invention may further include handles 44 and hooks 46 attached to the frame 10. For example, a pair of looped handles 44 may be attached to and extend from the rear member 14. A plurality of L-shaped closed loop hooks 46 may extend from both the rear member 14 and the side members 16. The handles 44 allow for easy manual pickup and readjustment of the trailer 10 when needed in tight situations where vehicle maneuvering may be hampered. The hooks 46 may be used to attached ratcheting straps or bungee cords used to secure wildlife/fishing equipment or other cargo to the frame 10.

The tongue 20 of the present invention is elongated beam having a distal end and a proximal end. In certain embodiments, the proximal end of the tongue 20 is pivotally attached to an underside of the frame 10. A pivot bracket 24 extends from the central member 17 and the proximal end of the tongue 20 is pivotally secured to the pivot bracket 24 by a pivot pin. A deployed locking bracket 26 and a stowed locking bracket 28 are each attached to the underside of the frame 10, such as to the central member 17. The deployed locking bracket 26 may be disposed near the front end of the frame 10, the stowed locking bracket 28 may be disposed closer to the rear end of the frame 10 and the pivot bracket 24 may be disposed in between the deployed locking bracket 26 and the stowed locking bracket 28. In a deployed position, the tongue 20 is pivoted to extend beyond front end of the frame 10 and is locked in the deployed locking bracket 26 by a locking pin 30. In a stowed position, the tongue 20 is pivoted 180 degrees to retract beneath the frame 10 and is locked in the stowed locking bracket 28 by a locking pin 30. The trailer is used when in the deployed position and is stowed away when in the stowed position.

The winch assembly includes an upright post 32, 34. In certain embodiments, the upright post 32, 34 extends vertically from the trailer tongue 20. However, the upright post 32, 34 may extend vertically from the front end of the frame 10. In certain embodiments, the upright post 32, 34 is extendable in length. For example, the upright post 32, 34 may include an internal post 32 that slides within an external post 34 and are thereby telescoping tubes. The internal post 32 and the external post 34 may include aligning openings running along a length. A lock pin 30 may fit within aligned openings of the internal post 32 and the external post 34, fixing the posts 32, 34 at a set length. The present invention may further include a brace post 36 angled and connecting the upright post 32, 34 and the trailer tongue 20 to add additional support. The winch 38 is attached to the top end of the upright post 32, 34. The winch 38 may either be a manual or electrically powered winch 38. A manual winch 38 may include a cylinder that is rotated by a handle. An elongated cord may be attached to the cylinder. An electrically powered winch 38 may include a motor powered by a battery. The motor may rotate the cylinder. The winch 38 alleviates the physical requirement of loading wildlife game or cargo onto the trailer.

The wheel assembly of the present invention includes an axle 40 and wheels 42 rotatably connected to the axle 40. The axle 40 may be secured directly to the underside frame 10 or may be secured to the underside of the frame 10 by axle braces. In certain embodiments, the present invention may include wheel covers 48 or fenders that are secured to the elongated transverse member 18 and the rear member 14. The wheel covers 48 may cover the wheels 42, preventing the wheels from kicking up dirt and debris onto the top of the trailer.

In certain embodiments, a plurality of L-brackets 68 may be secured to the upper surfaces of the wheel covers 48. In such embodiments, the present invention may be used in the snow. The wheel covers 48 may be detached from the top side of the frame 10 and secured to an underside of the frame 10, just beneath the wheels 42, such that the present invention now is in a sled configuration. The L brackets 68 when used in snowy conditions help to keep the sled tracking straight behind the ATV, UTV, etc.

The trailer of the present invention may further include decking 50 attached to a top of the frame 10. The decking 50 may be made of wood, such as pine, oak, poplar, birch and the like. Alternatively, the decking 50 may be made of a composite material or an aluminum sheet. The decking 50 may be secured to the frame 10 using nuts and bolts. In certain embodiments, pivoting racks 52 may be secured to the decking 50. The pivoting racks 52 may pivot to cover and retain wildlife and cargo on the trailer. The pivoting racks 52 may include flat plates comprising a bottom edge and a top edge. The bottom edge are attached to the decking 50 by hinges.

The present invention further encompasses a dual cart trailer. The dual cart trailer includes a primary cart 54, as described above, and a secondary cart 56. The secondary cart 56 includes a cart frame 58. The cart frame 58 is pivotally connected to the frame of the primary cart 54 by hinges 62. The secondary cart 56 may further include a decking 60 secured to the cart frame 58. The secondary cart 56 further includes a wheel assembly with an axle and wheels 64. In a deployed position, the decking 60 of the secondary cart 56 may be coplanar with the decking 50 of the primary cart 54 and the wheels 64 of the secondary cart and the wheels 42 of the primary cart 54 are rolling on a surface. In a stowed position, the secondary cart 56 is pivoted 180 degrees so that the decking 60 of the second cart 56 is above and laying on top of the decking 50 of the primary cart 54.

Figure 16:
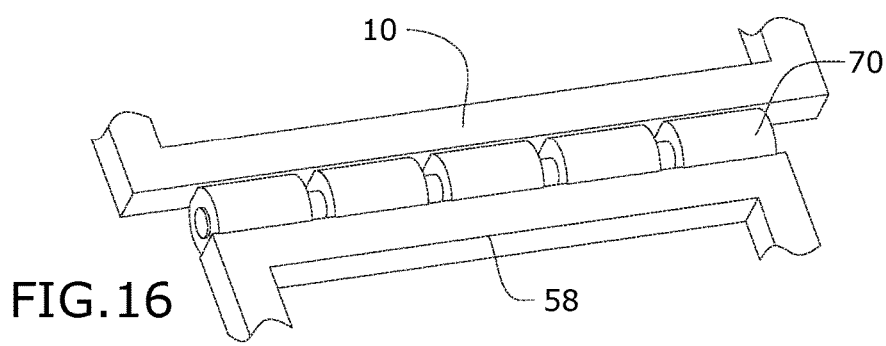
FIG. 16 is a detailed section view of an embodiment of the present invention.

FIG. 16 is an exemplary hinge 70 connecting the front of the cart frame 58 of the secondary cart 56 to the rear of the cart frame 10 of the primary cart 54. The hinge 70 may include cylindrical hollow pipes connected to the primary cart 54 and the secondary cart 56. The pipes are spaced apart so that the pipes of the primary cart 54 fit in between the pipes of the secondary cart 56 and the openings of the pipes align. A rod may fit within the aligned openings of the pipes, connecting the primary cart 54 to the secondary cart 56. The secondary cart 56 pivots along the axis of the rod.

It should be understood, of course, that the foregoing relates to exemplary embodiments of the invention and that modifications may be made without departing from the spirit and scope of the invention as set forth in the following claims.

What is claimed is:

1. A trailer comprising:
    a frame comprising a front end, a rear end and sides;
    a wheel assembly attached to the frame, the wheel assembly comprising an axle and a pair of wheels;
    a tongue pivotally attached to an underside of the frame by a pivot bracket, the tongue comprising a trailer coupler;
    a winch assembly comprising an upright post and a winch attached to the upright post, the winch assembly attached to at least one of the tongue and the frame and disposed near the front end of the frame; and
    a deployed locking bracket and a stowed locking bracket each attached to the underside of the frame and positioned so that the pivot bracket is disposed in between the deployed locking bracket and the stowed locking bracket, wherein
    the deployed locking bracket locks the tongue in a deployed position extending beyond the front end of the frame and the stowed locking bracket locks the tongue is a stowed position retracted beneath the frame.

2. The trailer of claim 1, wherein the frame comprises:
    a front member forming the front end;
    a rear member forming the rear end; and
    side members forming the sides, wherein
    the rear member comprises a greater length than the front member, and
    the side members are disposed at an angle relative to the front member and the rear member so that a distance between the side members increases from the front member to the rear member.

3. The trailer of claim 2, wherein the frame further comprises transverse members connecting the side members together.

4. The trailer of claim 3, wherein the transverse members comprise an elongated transverse member, wherein the wheel assembly is disposed in between the elongated transverse member and the rear member.

5. The trailer of claim 4, wherein the frame further comprises angle members extending from the side members to the elongated transverse member, wherein the angle members comprise a greater angle relative to the front member and rear member than the side members.

6. The trailer of claim 1, wherein the upright post comprises telescoping tubes and is thereby extendable in length.

7. The trailer of claim 1, further comprising a pair of handles extending from the rear end of the frame, and a plurality of hooks extending from the sides of the frame and the rear of the frame.

8. The trailer of claim 1, further comprising a secondary trailer attachment comprising:
    a secondary frame pivotally attached to the rear end of the frame by a hinge; and
    a secondary wheel assembly attached to the secondary frame and comprising an axle and a pair of wheels.

9. The trailer of claim 1, further comprising a pair of wheel covers, wherein each of the pair of wheel covers comprises at least one L-bracket secured to an upper surface, wherein the pair of wheel covers are releasably attached to a top side of the frame and releasably attachable to the underside of the frame.

10. The trailer of claim 1, further comprising a pair of pivoting racks each comprising a substantially flat board attached to the frame by hinges.

11. A trailer comprising:
    a frame comprising a front end, a rear end and sides;
    a wheel assembly attached to the frame, the wheel assembly comprising an axle and a pair of wheels;
    a tongue attached to and extending from the front end of the frame, the tongue comprising a trailer coupler;
    a winch assembly comprising an upright post and a winch attached to the upright post, the winch assembly attached to at least one of the tongue and the frame and disposed near the front end of the frame; and
    a secondary trailer attachment comprising:
        a secondary frame pivotally attached to the rear end of the frame by a hinge; and
        a secondary wheel assembly attached to the secondary frame and comprising an axle and a pair of wheels.

* * * * *